United States Patent Office 2,711,432
Patented June 21, 1955

2,711,432

NAPHTHALENE REFINING BY WASHING WITH A SURFACE ACTIVE AGENT

Zygmunt Krzesz, Montreal, Quebec, Canada, assignor to Dominion Tar & Chemical Company, Limited, Montreal, Quebec, Canada, a corporation of Canada No Drawing. Application August 3, 1949,
Serial No. 108,429

3 Claims. (Cl. 260—674)

This invention relates to the refinement of naphthalene.

Refined naphthalene as required by industry is a white crystalline substance melting at above 79° C. As derived from industrial distillation processes crude naphthalene is a brown to dark brown crystalline material, melting from about 70° C. depending on its degree of purity. It is difficult to refine and the usual method involves unsatisfactory procedures giving relatively low yields.

APPLICANT'S DEVELOPMENT

The applicant has now developed a simple and effective method of refining crude naphthalene.

In accordance with this method impurities are removed from impure naphthalene by putting it into finely divided form and agitating it in an aqueous solution of a surface tension depressant emulsifying agent so that the impurities are extracted in the form of an emulsion separable from the purified naphthalene. The purified naphthalene and the emulsified impurities are then separated.

This process may be effected by forming an aqueous emulsion with the surface tension depressant and the naphthalene in liquid form by heating to above the melting point of the naphthalene and crystallizing purified naphthalene from the emulsion. Alternatively, the naphthalene may be in finely divided solid form and then subjected to the action of the aqueous solution of the surface tension depressant at a temperature below the melting point of the naphthalene.

The applicant much prefers to employ the crystallizing technique which is described in more detail as follows because it gives improved melting point and color.

An aqueous emulsion is formed by placing in water the crude naphthalene and lipophobic surface tension depressant of a type effective to form an oil in water emulsion and bringing this charge to a temperature above the melting point of the naphthalene, with vigorous agitation. The naphthalene and impurities will form a dispersed phase. The emulsion is then cooled to below the freezing point of the naphthalene which causes its crystallization and precipitation from the emulsion freed from impurities. The naphthalene is recovered, for example by washing the crystals with a weak solution of a wetting agent which can, but need not be, the same as that used in the emulsion and then washing the crystals with water. The emulsification and crystallization procedure may be repeated if desired. Yields are considerably greater than in any prior art process known to the applicant.

Surface tension depressants which the applicant prefers to use are alkali salts of fatty acids, for example potassium oleate, alkali sulphate esters of fatty acids, for example the products known under the trade-mark "Tergitol," alkyl-aryl sulphonates, for example the product known under the trade-mark "Naxonate" (which is sodium xylene sulphonate). Other depressants may be used which are lipophobic and which are effective to form an oil in water emulsion but not to keep the crystalline naphthalene in emulsion.

In order that the invention may be understood in more detail, the following specific examples are given as illustrative.

Example I 50 grams of potassium oleate together with 5 grams of potassium hydroxide was added to 4 liters of water from the Montreal water supply. 500 grams of crude naphthalene (being a dark brown solid having a melting point of about 79° C.) was added to the charge of water and surface tension depressant. The mixture was agitated and heated to about 82° C. At this temperature apparently complete emulsification was obtained and the stirring was continued for about 5 minutes. The heating was then discontinued, but the agitation was continued and the system was allowed to cool spontaneously. At a temperature of about 70° C. naphthalene crystals appear and the temperature remains constant for some minutes. The beaker and contents were allowed to cool to about 50° C. The agitation was stopped and naphthalene crystals allowed to settle. The supernatant liquor was then decanted and the crystals washed once with 2000 cc. of a 1% aqueous solution of potassium oleate at about 60° C., then washed twice with 2 liter portions of city water at about 60° C. The washings were effected by settling and decantation. The settled slurry was then centrifuged and was washed with water while in the centrifuge until the effluent solution showed no test for alkalinity. The material was then spread out to air dry.

The yield of refined naphthalene in terms of crude material was 92%. This represents a yield in excess of 98% of the theoretical naphthalene content. The refined material was colorless and had a freezing point of about 79.3° C.

Example II

The procedure of Example I was followed using "Tergitol" as the surface tension depressant and the crystalline material resulting from the procedure was reprocessed in like manner again using "Tergitol."

The reprocessed material was colorless. It had a freezing point of about 79.8° C. The yield was 90.1% on the original crude material entered. This represents in excess of 98% based on the theoretical naphthalene content.

Discussion of Examples I and II

The applicant has found that about 4% surface tension depressant by weight on the naphthalene is effective but less may be employed provided that sufficient is used to form the emulsion. While not wishing to be committed to the theory, the applicant believes that the process depends on a "flash washing" at the point of crystallization, the occlusion of the oil being prevented by emulsification.

A heating range which the applicant has found to be effective is from about 82° C. to about 85° C. The normal heating time is from about 5 minutes to about 10 minutes, but shorter times are effective.

Usually, the starting crude naphthalenes have a melting point between about 70° C. and about 79° C. However, the process is effective for refining the crude product regardless of the melting point and products which are more or less refined can also be treated to bring them into a higher state of refinement. The refined naphthalene obtainable by this process is, to all intents and purposes, colorless and substantially pure.

A suitable concentration of the naphthalene in the emulsion has been found to be 2 pounds per gallon of water. This may vary as long as there is sufficient water to achieve the necessary emulsification.

*Example III*

50 grams of potassium oleate together with 5 grams of potassium hydroxide was added to 4 liters of water from the Montreal water supply. 500 grams of crude naphthalene (being a dark brown solid and having a melting point at about 78° C.) was crushed to a fine powder, for example in a ball mill. The crushed material was added to the aqueous solution of surface tension depressant. The mixture was agitated and heated to about 60° C., then agitated for about 30 minutes. The heating was then discontinued and the system allowed to cool spontaneously while agitation was continued. The agitation was then stopped and naphthalene crystals allowed to settle. The supernatant liquor was then decanted and the crystals washed once with 2000 cc. of a 1% aqueous solution of potassium oleate at about 60° C., then washed twice with 2 liter portions of city water at about 60° C. The washings were effected by settling and decantation. The settled slurry was then centrifuged and was washed with water while in the centrifuge until the effluent solution showed no test for alkalinity. The material was then air dried.

The yield of refined naphthalene was 92% of the original starting crude naphthalene which represents in excess of 98% of the theoretical naphthalene content. The refined naphthalene was also improved in color and had a freezing point of 79.2° C.

*Discussion of Example III*

The method of this example produced good results but not nearly as good as those achieved by Examples I and II.

I claim:
1. A process of refining naphthalene having entrained water-insoluble impurities which comprises agitating a charge containing a molten mass of the naphthalene in an aqueous solution of a lipophobic surface tension depressant of the type effective to form an oil-in-water emulsion thereby emulsifying the naphthalene and the impurities in the solution, then cooling the charge to below the freezing point of the naphthalene while agitating to cause naphthalene crystals free from entrained impurities to form, separating the naphthalene crystals from the emulsion, washing the crystals with an aqueous solution of a surface tension depressant, and then washing the crystals with water, the surface tension depressant being selected from the group consisting of alkali salts of fatty acids, alkali sulphate esters of fatty acids and alkyl aryl sulphonates.

2. A process according to claim 1, wherein the naphthalene in solid form is put into the first-mentioned solution of surface tension depressant at a temperature below the melting point of the naphthalene, and the temperature of the charge is then raised above the melting point of the naphthalene.

3. A process according to claim 1 wherein said surface tension depressant is potassium oleate.

References Cited in the file of this patent
UNITED STATES PATENTS

| Number | Name | Date |
|---|---|---|
| 1,431,394 | Gould | Oct. 10, 1922 |
| 1,441,417 | Gould | Jan. 9, 1923 |
| 1,481,197 | Gould | Jan. 15, 1924 |
| 2,078,963 | Miller | May 4, 1937 |
| 2,207,752 | Miller | July 16, 1940 |
| 2,395,857 | Foster et al. | Mar. 5, 1946 |
| 2,499,236 | Van Gilder et al. | Feb. 28, 1950 |